UNITED STATES PATENT OFFICE.

JOHN WARNE PHILLIPS, OF CHICAGO, ILLINOIS.

COLLOIDAL SUSPENSION OF POLYMERS AND PROCESS OF MAKING THE SAME.

1,395,242. Specification of Letters Patent. Patented Oct. 25, 1921.

No Drawing. Application filed March 6, 1919. Serial No. 281,067.

*To all whom it may concern:*

Be it known that I, JOHN WARNE PHILLIPS, a citizen of the United States, residing at Chicago, in the county of Cook and State of Illinois, have invented a new and useful Improvement in Colloidal Suspension of Polymers and Processes of Making the Same, of which the following is a specification.

This invention relates to suspensions of polymerized tung or China wood oils in colloidal state in liquid vehicles and more particularly to such suspensions having a volatilizable liquid vehicle and suitable for coating and impregnating purposes; it relates furthermore to processes for producing such suspensions and maintaining them in stable form.

In accordance with my invention I prefer to utilize as a medium for the dispersion of the polymerized tung oil any liquid or mixture of liquids wherein tung oil in its normal or commercial, unpolymerized state is soluble. In the selected liquid I dissolve tung oil in proportions found most suitable for the purpose intended. The solution thus produced is then subjected to the action of polymerizing agents, preferably avoiding heat. The polymerization may be effected, for example, by agitation with air or other gas at room temperature, suitable means being provided to prevent loss of the solvent. Polymerization of the oil may be accelerated by means of light or by catalysts, preferably catalysts soluble in the solvent used for the oil or in the oil itself such as lead or manganese resinates. I may likewise add to the oil solution, substances capable of stabilizing or increasing the permanence of the colloidal suspension of the polymers of the oil, such as carbon-disulfid, sulfur, sulfur dichlorid and esters such as those derived from the esterification of resins with glycerol; such stabilizing substances, if volatile, are preferably added subsequent to polymerization; but if nonvolatile may be added prior thereto. I may also, if desired, dissolve in the vehicle other substances such as resins and the like to secure desired characteristics in the final composition and coating produced thereby.

In the highly dispersed state in which the oil is present in its solvent vehicle, its polymerization may be effected in a relatively short time, the progress of the polymerization being readily observed by the increase in viscosity of the solution and the decrease in its penetrativeness when placed or rubbed on unsized paper or cloth. Polymerization of all of the oil, which may occur when the oil is agitated with air at room temperature in from 8 to 20 hours, is indicated by a brightening in the appearance of the solution and by the fact that the solution no longer penetrates cardboard or unsized paper with an oil stain, but remains on the surface. Thus, whereas, when a drop of the oil solution wherein the oil is not entirely polymerized is placed upon a sheet of clean, white blotting paper, penetration of the liquid in all directions is observed almost immediately, on placing a drop of the colloidal solution of the polymers of the oil, produced as hereinafter described on a like sheet of blotting paper, no perceptible penetration occurs even after a period of 10 to 15 minutes and an oil stain is not produced. The extent of polymerization may be further increased, the colloidal solution becoming more viscous, less penetrative and of more jelly-like consistency on increased polymerization.

As an example of the formation of a colloid solution of the character hereinbefore described, I may incorporate tung oil in turpentine in the proportions of about 20 parts of oil to 80 parts of turpentine. If desired I may previously incorporate into the oil a polymerization catalyst, such as lead resinate, in the proportions of 0.1 to 0.4 parts of the catalyst to 20 parts of the oil in any suitable manner, for example, by admixture with the oil warmed to a temperature of about 100° C. The solution of oil and catalyst in the solvent may be clarified by filtration, if desired, and polymerization of the oil in the solution may then be effected by passing a gas, such as air, therethrough at normal room temperature for a period of 8 to 20 hours, depending upon the extent of polymerization desired. It is apparent that where a greater penetrativeness is desired a less polymerization may be more suitable, whereas in a composition primarily for producing a surface coating a greater polymerization may be advantageous. It has been found that the acidity of the oil somewhat affects the period necessary for polymerization thereof, an oil of higher acidity requiring a slightly longer period to reach the same stage of polymerization. A period of 12 hours will, however, with an average oil, produce a product capable of use both as an impregnating and coating agent. After polymerization the colloidal solution may be clarified by sedimentation.

Where a process involving agitation with gas is used to effect the polymerization, it is desirable to take measures to prevent loss of solvent. Any suitable means may be utilized for this purpose, such as, for example, carrying the gas used in a closed circuit or utilizing a solvent condensing means, such means being well known to those skilled in the use of solvents.

Prior to polymerization of the dissolved oil, I may incorporate into the solution a compound which I term a stabilizer; that is, a compound having the power of aiding in maintaining the polymerized oil in suspension and preventing coagulation thereof. As an example of such a compound I may use, for example, one-half per cent. or less of the resin esters produced by treating resin with glycerol, which are dissolved in the solution before polymerization of the oil. I may also utilize any of the stabilizing compounds hereinbefore mentioned. In the case of the use of sulfur dichlorid, I may add a small proportion of sulfur dichlorid, for example, one-half per cent. or less, after polymerizing or I may add a larger proportion of sulfur-treated suspension of tung oil polymers prepared as subsequently described. Of such sulfur-treated suspension I may use, for example, one per cent. in the oil suspension after polymerization.

In using a colloidal suspension or solution of polymerized tung oil prepared in accordance with my invention it may be applied as a varnish or coating composition and the solvent removed by evaporation at normal atmospheric or at higher temperatures. A continuous non-oxidizable deposit or film of polymerized tung oil will remain, which deposit has no oily characteristics and is insoluble, not only in water, but also in alcohol, oils, and in oil solvents such as naphtha, benzin, etc. With respect to the medium in which it was previously dispersed the polymerized oil acts as an irreversible colloid and is not again taken up thereby. The deposit or film of polymerized tung oil may be applied in its suspended state to a textile material, such as light cottons, silks, linens, etc., or to heavy materials such as duck, canvas, auto-top material, etc., or to leather, rubber or fibrous materials, such as paper, wood, etc. It may be forced into the material to which applied by fluid, air or mechanical pressure; thus, in the case of textiles, forming water and oil repellent fabrics. It may also be applied merely as a surface coating in any desired state of polymerization and to any desired thickness and with a solvent of a volatility suitable to the purpose intended. Thus a quick drying water and oil proof coating may be obtained by the use of a highly volatile naphtha or gasolene as a vehicle. Where a less rapidly drying varnish or coating is desired, a less volatile solvent may be used, such as turpentine or amyl acetate, or a mixture of turpentine and gasolene, acetone, etc. In this case, if desired, the coating or deposit may be moderately heated to expel the solvent more rapidly. The oil solvent used may be selected with respect to the volatility of its ingredient or ingredients in accordance with the usual practice in the coating composition and varnish art.

It is furthermore apparent that any desired pigment may be incorporated in the suspension and will effect the coloration of the coating or deposit of polymerized tung oil. Thus, if a transparent coating or deposit is desired, a transparent, soluble color, such as an anilin dye, may be utilized and if an opaque color is desired a mineral pigment or a lake may be used.

The coating or deposit may likewise be baked or heated to a temperature of from 225 to 300° C. to convert it to a deposit of the hard lacquer type, if such a coating is desired.

A sulfur-polymerized tung oil suspension may also be obtained in accordance with my invention by the incorporation into the polymerized oil suspension of a suitable reagent containing available sulfur; for example, sulfur dichlorid. Thus, in proceeding in accordance with the example of my process hereinbefore described, I may incorporate into the solution containing 20 parts of tung oil, 0.1–0.4 parts of catalyst and 80 parts of solvent, one to two parts of sulfur dichlorid after proceeding with the polymerization in the manner described. The resulting suspension has substantially the same viscosity and low degree of penetrativeness as the corresponding product from which sulfur is absent, but has greater opacity and milkiness. This suspension may be utilized in the same manner as that of the polymerized oil prepared as previously described, the resulting product, however, being somewhat more water resistant.

Although I have in the preceding specification described specific modes of practising my invention and have suggested theories as to the chemical and physical changes involved, I desire it to be clearly understood that my invention is not limited thereto, except in so far as such limitations are contained in the following claims. Furthermore, the uses and applications of my invention are not limited to those hereinbefore stated, but are widely varied and further uses may obviously be developed by reason of the special advantages inherent in my invention.

Having fully and clearly described my invention, I claim:

1. The process of forming a colloidal suspension of polymers of polymerizable chemical compounds which comprises dispersing the chemical compounds in the suspension vehicle and polymerizing the dispersed chemical compounds.

2. The process of forming a suspension of tung oil polymers which comprises dissolving tung oil in a solvent and polymerizing the dispersed oil.

3. The process of forming a suspension of tung oil polymers which comprises dissolving tung oil in turpentine and polymerizing the dispersed oil.

4. The process of forming a suspension of polymers of polymerizable chemical compounds which comprises forming a solution of the chemical compounds in a vehicle and polymerizing the dispersed compounds in the presence of a catalyst.

5. The process of forming a suspension of polymers of polymerizable chemical compounds which comprises forming a solution of the chemical compounds in a vehicle and polymerizing the dispersed compounds in the presence of a catalyst and a stabilizing compound.

6. The process of forming a suspension of tung oil polymers which comprises forming a solution of the oil and polymerizing the dispersed oil in the presence of a catalyst.

7. The process of forming a suspension of tung oil polymers which comprises forming a solution of the oil and polymerizing the dispersed oil in the presence of lead resinate.

8. The process of forming a suspension of tung oil polymers which comprises forming a solution of the oil and polymerizing the dispersed oil in the presence of a catalyst and a stabilizing compound.

9. The process of forming a suspension of polymers of polymerizable chemical compounds which comprises dispersing said compounds in a liquid vehicle and polymerizing the dispersed compounds, a reactive stabilizing compound being supplied in the suspension.

10. The process of forming a suspension of derivatives of tung oil polymers which comprises dissolving tung oil in a solvent and polymerizing the dispersed oil, sulfur dichlorid being supplied in the suspension.

11. The process of treating tung oil which consists in dissolving the oil in a vehicle in the proportions of 20 parts of oil to 80 parts of vehicle, adding thereto small amounts of a catalyst and a stabilizer, and agitating the solution of the oil by means of a gas, thereby polymerizing the dispersed oil.

12. A suspension of dispersed tung oil polymers.

13. A suspension of dispersed tung oil polymers in turpentine.

14. A suspension of dispersed tung oil polymers in tung oil solvents.

15. A suspension of dispersed tung oil polymers in volatile tung oil solvents.

16. A suspension of sulfur derivatives of tung oil polymerids in a tung oil solvent.

JOHN WARNE PHILLIPS.